(12) United States Patent
Yamada

(10) Patent No.: US 9,519,835 B2
(45) Date of Patent: Dec. 13, 2016

(54) EFFICIENT BIOMETRIC AUTHENTICATION USING NARROWED BIOMETRIC DATA

(71) Applicant: FUJITSU LIMITED, Kawasaki-shi, Kanagawa (JP)

(72) Inventor: Shigefumi Yamada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 14/467,195

(22) Filed: Aug. 25, 2014

(65) Prior Publication Data

US 2014/0363055 A1 Dec. 11, 2014

Related U.S. Application Data

(63) Continuation of application No. PCT/JP2012/058519, filed on Mar. 30, 2012.

(51) Int. Cl.
*G06K 9/00* (2006.01)
*G06K 9/68* (2006.01)

(52) U.S. Cl.
CPC ........... *G06K 9/00885* (2013.01); *G06K 9/685* (2013.01)

(58) Field of Classification Search
None
See application file for complete search history.

(56) References Cited

U.S. PATENT DOCUMENTS

| | | | | |
|---|---|---|---|---|
| 7,646,893 B2 * | 1/2010 | Yamada | ............. | G06K 9/00006 382/115 |
| 2002/0048390 A1 | 4/2002 | Ikegami | | |
| 2005/0223236 A1 | 10/2005 | Yamada et al. | | |
| 2008/0211627 A1 * | 9/2008 | Shinzaki | ................. | G06F 21/32 340/5.82 |
| 2009/0161921 A1 | 6/2009 | Ohnishi | | |
| 2009/0169072 A1 * | 7/2009 | Lo | .......................... | G06K 9/001 382/125 |

FOREIGN PATENT DOCUMENTS

| | | |
|---|---|---|
| JP | 2002-32757 | 1/2002 |
| JP | 2002-133416 | 5/2002 |
| JP | 2003-186847 | 7/2003 |
| JP | 2003-337949 | 11/2003 |
| JP | 2004-145447 | 5/2004 |
| JP | 2005-275508 | 10/2005 |
| JP | 2005-284973 | 10/2005 |
| JP | 2008-65572 | 3/2008 |
| JP | 2009-151711 | 7/2009 |
| JP | 4405656 | 11/2009 |
| JP | 2011-253326 | 12/2011 |

OTHER PUBLICATIONS

International Search Report mailed May 1, 2012, in corresponding International Patent Application No. PCT/JP2012/058519.

* cited by examiner

*Primary Examiner* — Siamak Harandi
(74) *Attorney, Agent, or Firm* — Staas & Halsey LLP

(57) ABSTRACT

A biometric authentication device includes: a biometric sensor that obtains biometric information; a memory; and a circuitry configured to: select an objective user according to density of a predetermined range including a comparison-use part data that is a part of a comparison-use feature data extracted from the biometric information in a class of a registered part data that is a part of a registered feature data; and perform comparing between a registered feature data of a selected objective user and the comparison-use feature data.

17 Claims, 13 Drawing Sheets

| ORDER | REGISTERED DATA | SCORE FOR NARROWING |
|---|---|---|
| 1 | REGISTERED DATA 050 | 10 |
| 2 | REGISTERED DATA 002 | 20 |
| 3 | REGISTERED DATA 010 | 30 |
| 4 | REGISTERED DATA 100 | 40 |
| 5 | REGISTERED DATA 030 | 50 |
| ... | ... | ... |

EFFICIENT BIOMETRIC AUTHENTICATION USING NARROWED BIOMETRIC DATA

CROSS-REFERENCE TO RELATED APPLICATION

This application is a continuation application of PCT/JP2012/058519 filed on Mar. 30, 2012, the contents of which are herein wholly incorporated by reference.

FIELD

A certain aspect of embodiments described herein relates to a biometric authentication device, a biometric authentication method and a computer-readable, non-transitory medium.

BACKGROUND

In a biometric authentication, a comparing is performed between a data for comparison obtained by a biometric sensor and a registered data that is registered in a database. As the number of registered user increases, both high accuracy of authentication and reduction of authentication time are demanded. A technology to improve authentication accuracy is disclosed (for example, with reference to Japanese Patent Application Publication No. 2008-65572 (hereinafter referred to as Document 1)). Reduction of authentication time is disclosed (for example, with reference to Japanese Patent Application Publication No. 2002-133416 (hereinafter referred to as Document 2)).

SUMMARY

According to an aspect of the present invention, there is provided a biometric authentication device including: a biometric sensor that obtains biometric information; a memory; and a circuitry configured to: select an objective user according to density of a predetermined range including a comparison-use part data that is a part of a comparison-use feature data extracted from the biometric information in a class of a registered part data that is a part of a registered feature data; and perform comparing between a registered feature data of a selected objective user and the comparison-use feature data.

According to another aspect of the present invention, there is provided a biometric authentication method including: selecting an objective user according to density of a predetermined range including a comparison-use part data that is a part of a comparison-use feature data extracted from the biometric information obtained by a biometric sensor in a class of a registered part data that is a part of a registered feature data; and performing a comparing between a registered feature data of a selected objective user and the comparison-use feature data.

According to another aspect of the present invention, there is provided a computer readable, non-transitory medium storing a program that causes a computer to execute a process, the process including: selecting an objective user according to density of a predetermined range including a comparison-use part data that is a part of a comparison-use feature data extracted from biometric information obtained by a biometric sensor in a class of a registered part data that is a part of a registered feature data; and performing comparing between a registered feature data of a selected objective user and the comparison-use feature data.

DESCRIPTION OF EMBODIMENTS

In the technology of Document 1 and Document 2, it is difficult to select a user for comparing accurately. Therefore, it is difficult to achieve both high accuracy of authentication and reduction of authentication time.

Biometric information that can be applied to the following embodiments is not limited. The biometric information is a finger print, a face, a palm shape, an iris, a vein or the like. A feature data is independently extracted from biometric information and is used for a comparing process of a person authentication. For example, the feature data is a pattern of a finger print image, a positional relationship of a finger print minutia, a pattern of a palm vein image or the like. A narrowed data is a part data of the feature data (a part of the feature data) and is used for a narrowing process of users to be subjected to a comparing. For example, the narrowed data is a width of a ridge line, an interval between adjacent ridge lines, the number of minutia per unit of area (minutia density) or the like when the finger print image is used as the biometric information.

First Embodiment

Figure 1:
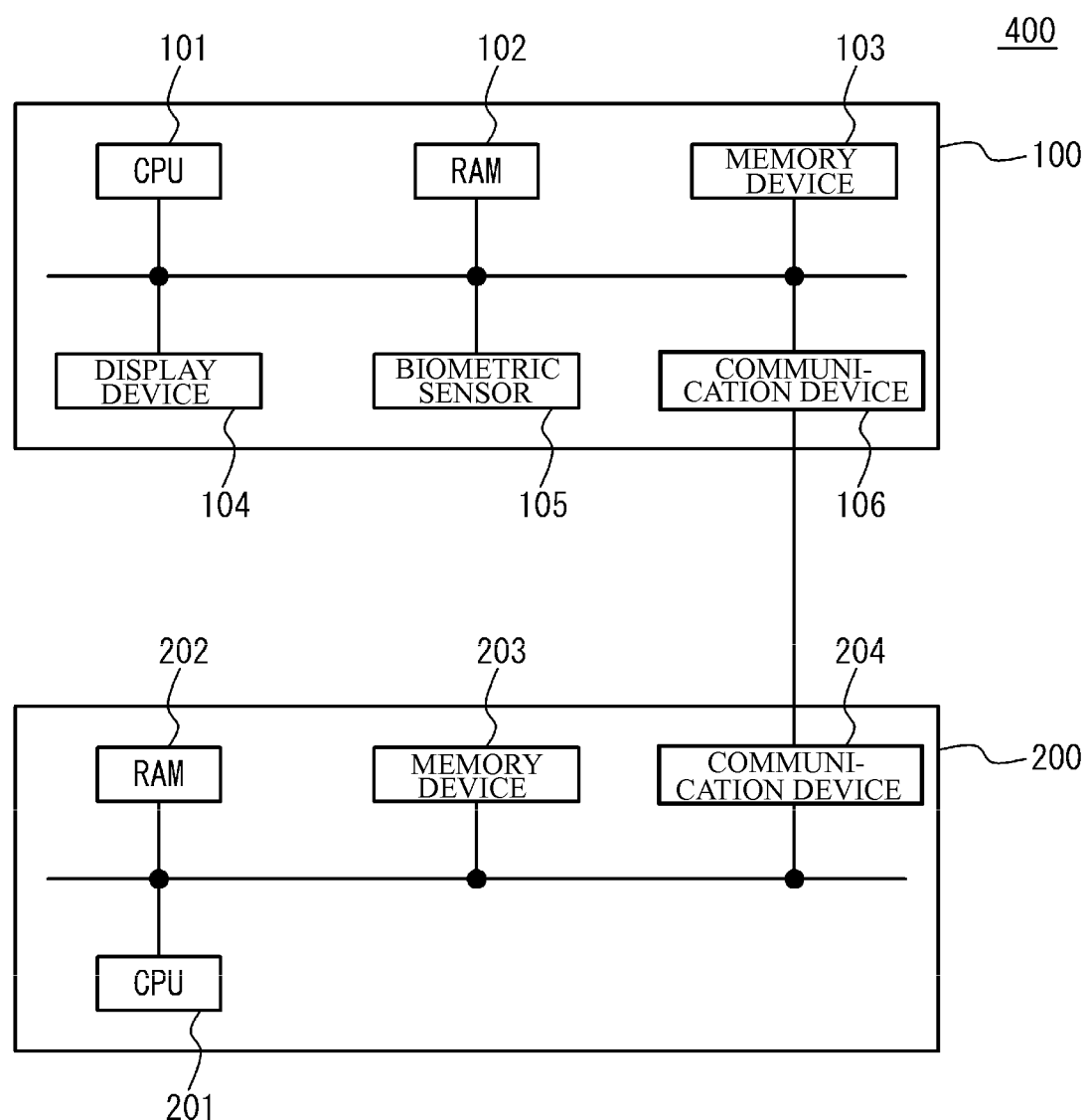
FIG. 1 illustrates a block diagram for describing a hardware structure of a biometric authentication device in accordance with a first embodiment.

FIG. 1 illustrates a block diagram for describing a hardware structure of a biometric authentication device 400 in accordance with a first embodiment. As illustrated in FIG. 1, the biometric authentication device 400 has a structure in which a terminal 100 and an authentication server 200 is coupled with each other via a network. The terminal 100 has a CPU 101, a RAM 102, a memory device 103, a display device 104, a biometric sensor 105, a communication device 106 and so on. The authentication server 200 has a CPU 201, a RAM 202, a memory device 203, a communication device 204 and so on.

The CPUs 101 and 201 are a central processing unit. The CPUs 101 and 201 include one or more core. The RAM (Random Access Memory) 102 is a volatile memory temporally storing a program executed by the CPU 101, a data processed by the CPU 101, and so on. The RAM 202 is a volatile memory temporally storing a program executed by the CPU 201, a data processed by the CPU 201, and so on. The memory devices 103 and 203 are nonvolatile memory devices. The memory devices 103 and 203 may be SSDs (Solid State Drive) such as ROMs (Read Only Memory) or flash memories, or hard disks driven by hard disk drives. A biometric authentication program in accordance with the first embodiment is stored in one of the memory devices 103 and 203. Or, the biometric authentication program is divided into both of the memory devices 103 and 203.

The display device 104 is a liquid crystal display, an electro luminescence panel or the like and displays a result of a biometric authentication process. The biometric sensor 105 is a sensor to obtain a biometric information of a user. In the embodiment, the biometric sensor 105 is a finger print sensor that converts a finger print image of a user into a digital image. The finger print sensor may be a weak electrolytic type, an electro static capacitance type, an optical type, a thermosensitive type, a ultrasonic type or the like. The communication devices 106 and 204 may be connection interfaces to a LAN (Local Area Network).

The biometric authentication program stored in the memory devices 103 and 203 is developed in the RAMs 102 and 202. The CPU 101 executes the program developed in the RAM 102. The CPU 201 executed the program developed in the RAM 202. Thus, each process of the biometric authentication device 400 is executed.

When the biometric authentication program is executed, a biometric data registering process, a biometric authentication process and so on are performed. The biometric data register process is a process in which a feature data of an unregistered new user (hereinafter referred to as a user to be registered) and a narrowed data extracted from the feature data are registered as a registered feature data and a registered narrowed data. The biometric authentication process is a process in which objective users are narrowed by a comparing between a comparison-use feature data obtained during an authentication and a registered narrowed data, and a user to be authenticated is specified from the narrowed users by a comparing between the comparison-use feature data and a registered feature data.

Figure 2:
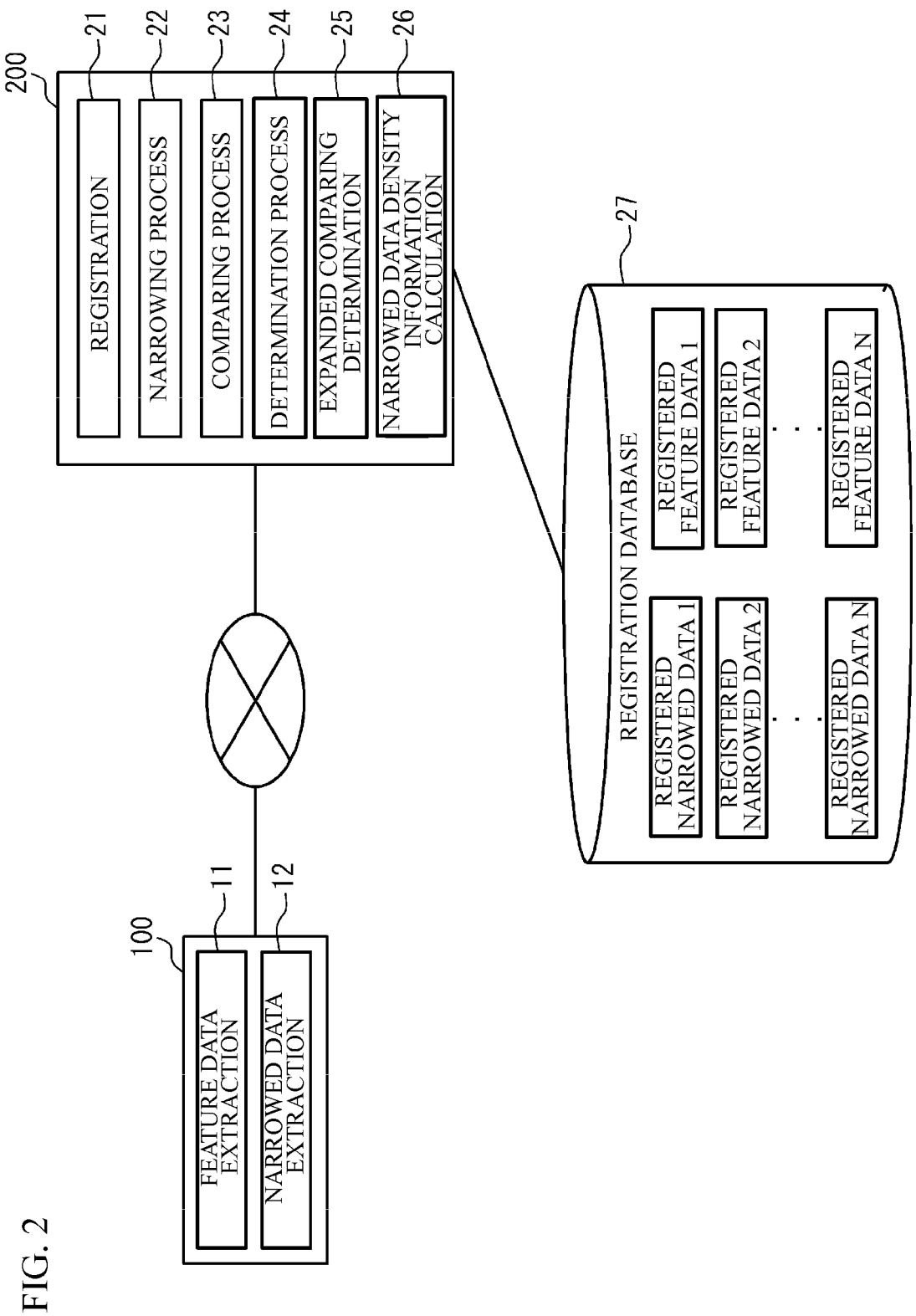
FIG. 2 illustrates a block diagram of each function realized by an execution of a biometric authentication program.

FIG. 2 illustrates a block diagram of each function realized by an execution of the biometric authentication program. When the authentication program is executed, a feature data extraction unit 11 and a narrowed data extraction unit 12 are realized in a terminal 100. In the authentication server 200, a registration unit 21, a narrowing process unit 22, a comparing process unit 23, a determination process unit 24, an expanded comparing determination unit 25, a narrowed data density information calculation unit 26 and a registration database 27.

[Biometric Data Registering Process]

Figure 3:
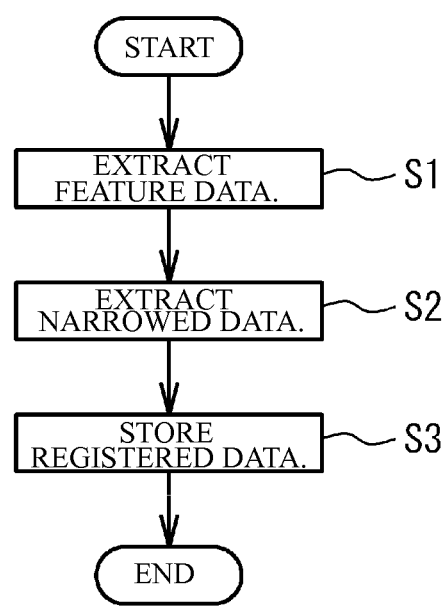
FIG. 3 illustrates an example of a flowchart executed in a biometric data registering process.

FIG. 3 illustrates an example of a flowchart executed in the biometric data registering process. With reference to FIG. 3, a description will be given of the biometric data registering process. The feature data extraction unit 11 extracts a feature data from biometric information obtained by the biometric sensor 105 (Step S1). In the embodiment, a minutia extracted from a finger print ridge line pattern is used as the feature data. The narrowed data extraction unit 12 extracts a narrowed data from the feature data extracted in the Step S1 (Step S2). In the embodiment, a width of the ridge line, an interval of adjacent ridge lines, the number of the minutia per unit of area (minutia density) or the like is used as the narrowed data. Next, the registration unit 21 relates a user ID or the like to the registration database 27, and registers the feature data and the narrowed data as a registered feature data and a registered narrowed data (Step S3). With the processes, the biometric data registering process is terminated.

[Biometric Authentication Process]

Figure 4:
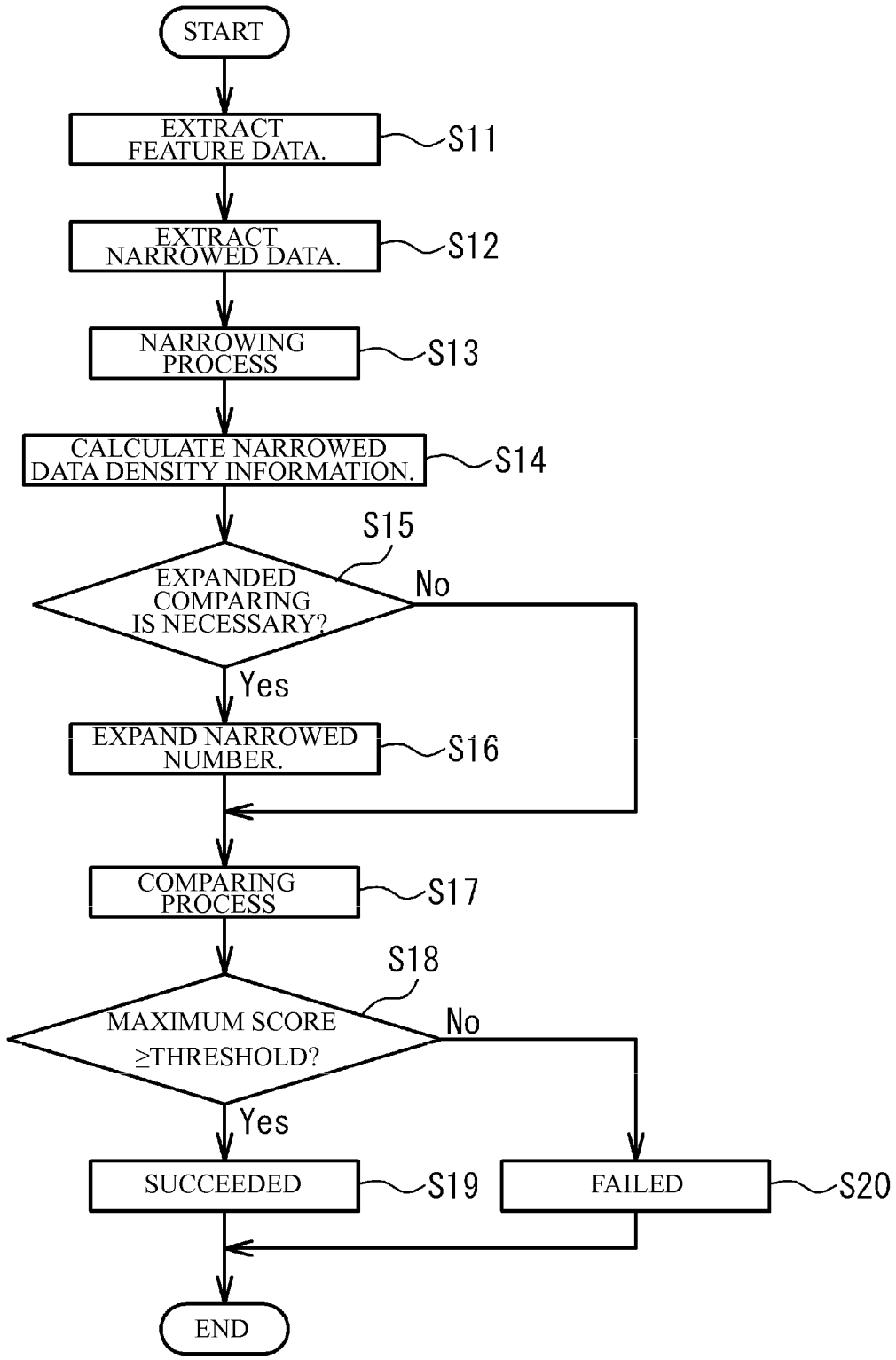
FIG. 4 illustrates an example of a flowchart executed during a biometric authentication process.

When a registered user to be authenticated is going to log into the terminal 100 or the like, the biometric authentication device 400 performs a biometric authentication process. FIG. 4 illustrates an example of a flowchart executed during the biometric authentication process. A description will be given of an example of the biometric authentication process. First, the feature data extraction unit 11 extracts a comparison-use feature data from biometric information obtained by the biometric sensor 105 (Step S11). Next, the narrowed data extraction unit 12 extracts a comparison-use narrowed data from the comparison-use feature data extracted in the Step S11 (Step S12).

Next, the narrowing process unit 22 performs a narrowing process (Step S13). The narrowing process unit 22 calculates a score for narrowing with respect to each user by comparing the comparison-use narrowed data with a registered narrowed data of each user. The narrowing process unit 22 selects a predetermined number of registered feature data in descending order according to the score for narrowing when a similarity is used as the score for narrowing. On the other hand, the narrowing process unit 22 selects a predetermined number of registered feature data in ascending order according to the score for narrowing when a difference degree (distance) is used as the score for narrowing. The difference degree is included in the same concept as the similarity in a point that the difference degree has opposite property with respect to the similarity. As a calculation method of the score for narrowing, the narrowed data is considered as a vector data, and a distance between the comparison-use narrowed data and the registered narrowed data (Euclidean distance, city block distance or the like) can be used.

Figures 5A, 5B:
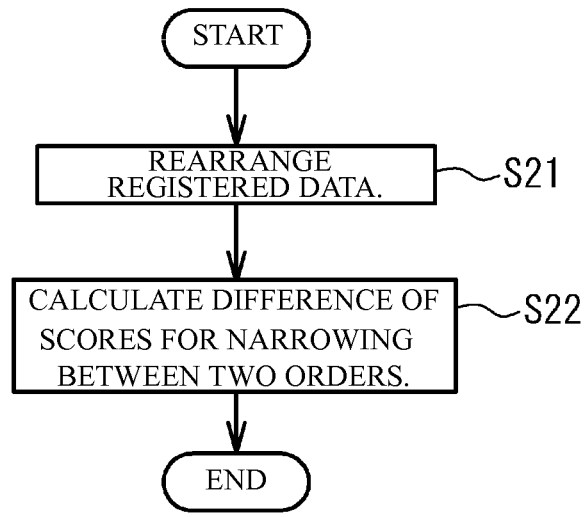
FIG. 5A illustrates an example of a flowchart of details of Step S14.
FIG. 5B illustrates an example of a list of rearranged registered narrowed data.

Next, the narrowed data density information calculation unit 26 calculates density information indicating a density of the registered narrowed data near the comparison-use narrowed data (a predetermined range including the comparison-use narrowed data) with use of a class of the registered narrowed data (Step S14). FIG. 5A illustrates an example of a flowchart of details of the Step S14. As illustrated in FIG. 5A, the narrowed data density information calculation unit 26 rearranges the registered narrowed data in descending order or ascending order according to the score for narrowing (Step S21). FIG. 5B illustrates an example of a list of the rearranged registered narrowed data. Next, the narrowed data density information calculation unit 26 obtains two scores for narrowing of predetermined order, and obtains the density information by calculating a difference between the two scores for narrowing (Step S22).

Figure 6A:
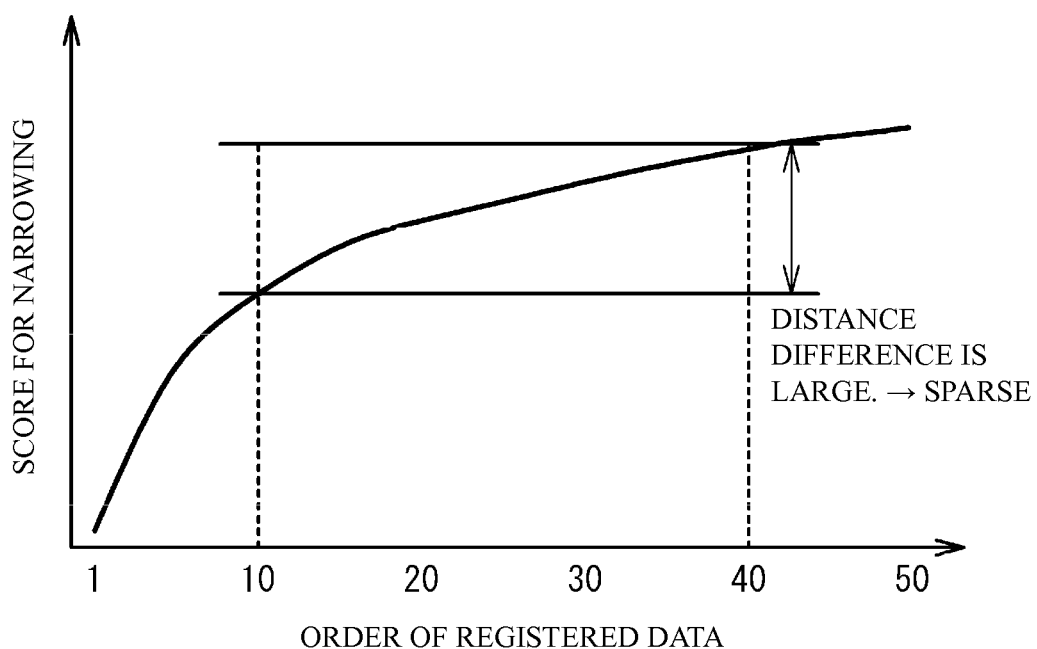
FIG. 6A and FIG. 6B illustrate a case where predetermined orders are tenth and fortieth.
Figure 6B:
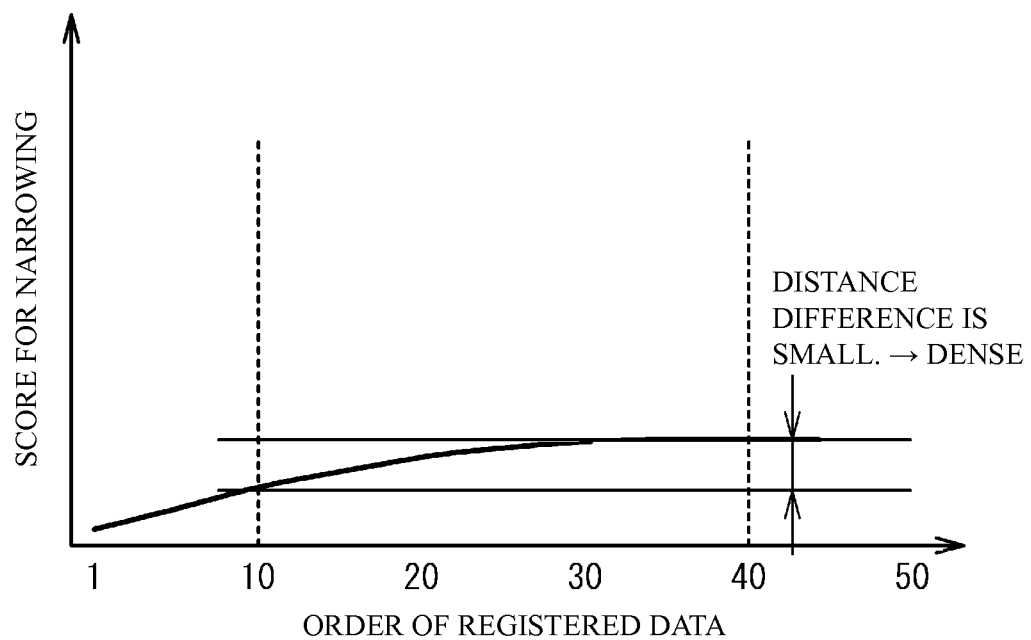

FIG. 6A and FIG. 6B illustrate a case where the above-mentioned predetermined orders are tenth and fortieth. In FIG. 6A and FIG. 6B, a horizontal axis indicates an order, and a vertical axis indicates a score for narrowing (distance) between a comparison-use narrowed data and a registered narrowed data. As illustrated in FIG. 6A, in a region where distribution of the registered narrowed data is sparse, the number of the registered narrowed data that are similar to each other is small. Therefore, a difference between scores for narrowing of the predetermined orders gets larger. On the other hand, as illustrated in FIG. 6B, in a region where distribution of the registered narrowed data is dense, the number of the registered narrowed data that are similar to each other is large. Therefore, the difference between the scores for narrowing of the predetermined orders gets smaller. Base on these tendencies, the difference of the scores for narrowing of the predetermined orders can be used as the density information of the registered narrowed data near the comparison-use narrowed data.

The predetermined order used for the calculation of the density information may be determined in accordance with total number of the registered narrowed data. Although the difference of the scores for narrowing of the predetermined order is used as the density information, a ratio of the scores for narrowing (a score of fortieth/a score of tenth) may be used as the density information. Another statistic amount may be used. Although the narrowed data density information calculation unit 26 rearranges the registered narrowed data, a result obtained by the narrowing process unit 22 may be used.

Figure 7A:
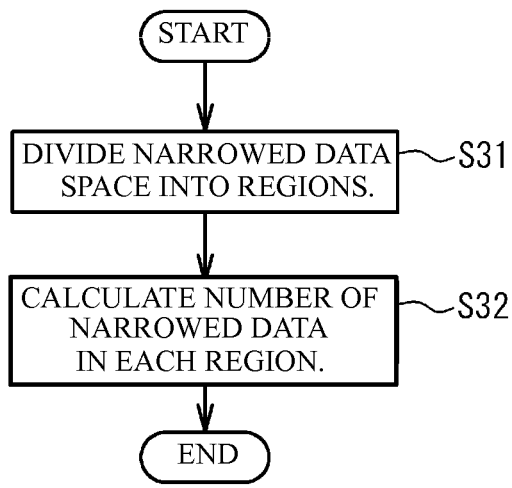
FIG. 7A to FIG. 7C illustrate another example of calculation of narrowed data density information.
Figure 7B:
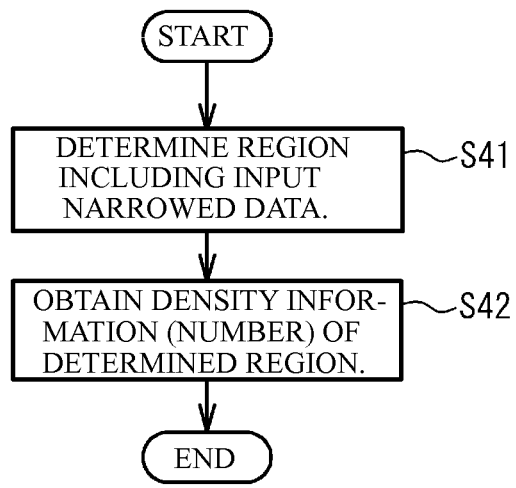
Figure 7C:
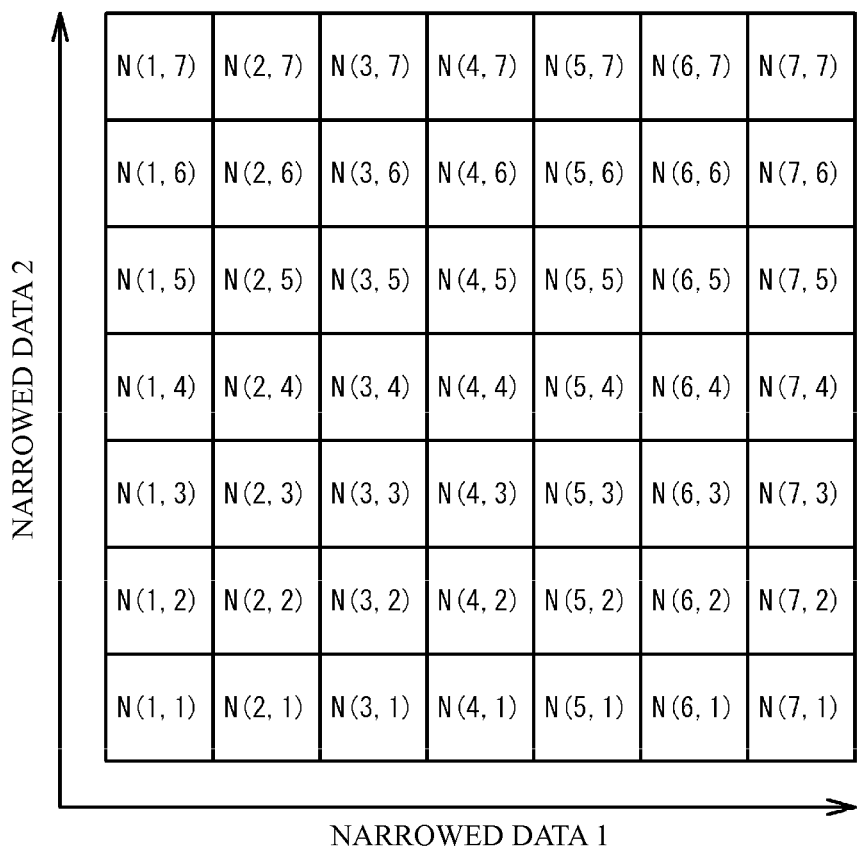

FIG. 7A to FIG. 7C illustrate another example of the calculation of the narrowed data density information. FIG. 7A illustrates an example of a flowchart executed during the biometric data registration process. The narrowed data extraction unit 12 divides a registered narrowed data space registered in the registration database 27 into predetermined regions (Step S31). Next, the narrowed data extraction unit 12 calculates the number of the registered narrowed data included in each region (Step S32). With the processes, a prior process with respect to the registered narrowed data can be performed.

FIG. 7C illustrates distribution of the number of the registered narrowed data. In FIG. 7C, N(i, j) indicates the number of each region. FIG. 7C illustrates a case where the number of elements (dimension number) of the registered narrowed data is two. The narrowed data extraction unit 12 may register each number of the regions or a value obtained by dividing the number of each region by the total number may be registered in the registration database 27.

FIG. 7B illustrates an example of a flowchart executed during the biometric authentication process. The flowchart of FIG. 7B is, for example, executed during executing of the Step S14 of FIG. 4. The narrowed data density information calculation unit 26 determines a region in which a comparison-use narrowed data exists (Step S41). Next, the narrowed data density information calculation unit 26 obtains density information (number) of the region determined in the Step S41 (Step S42). With the processes, the narrowed data density information calculation unit 26 is capable of obtaining the narrowed data density information. The class of the registered narrowed data may be the registered narrowed data registered in the registration database 27 or may be a class of data for studying that is different from the registered narrowed data.

Figure 8A:
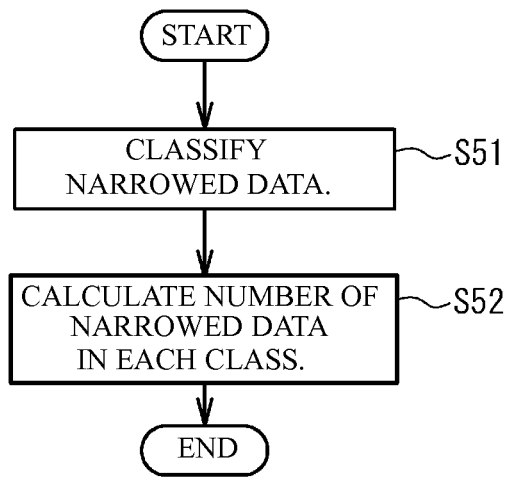
FIG. 8A to FIG. 8C illustrate another example of calculation of narrowed data density information.
Figure 8B:
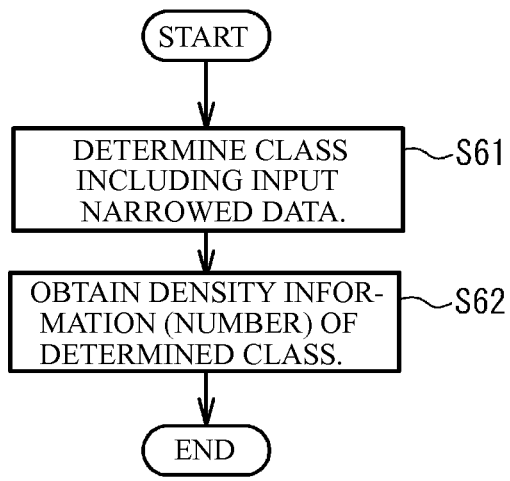
Figure 8C:
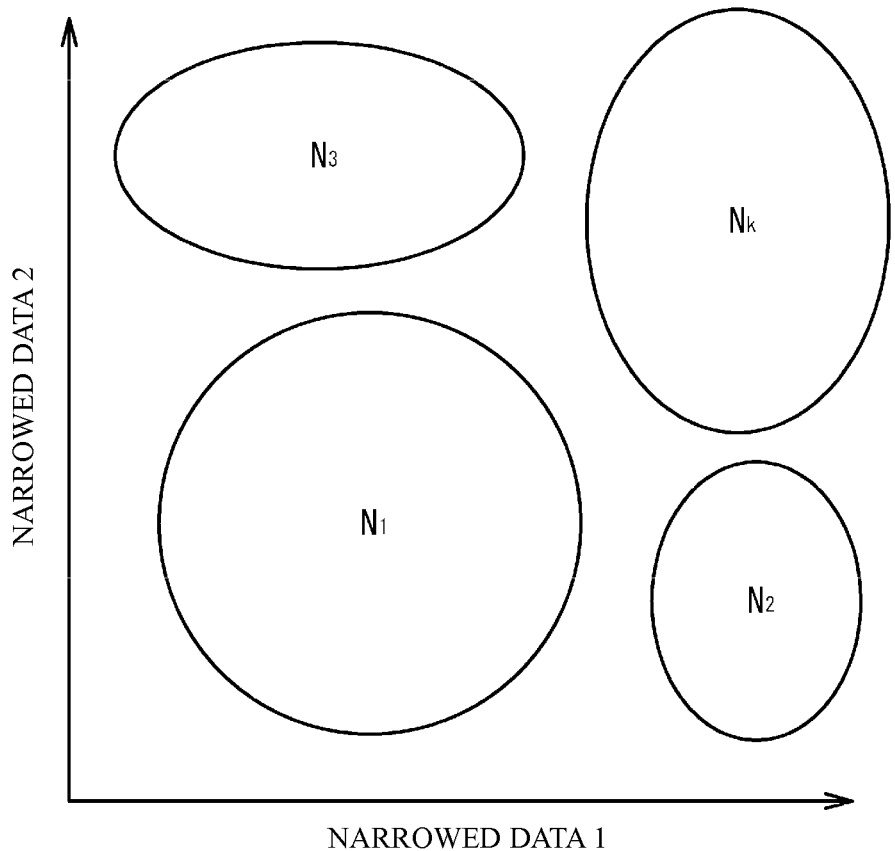

FIG. 8A to FIG. 8C illustrate another example of calculation of narrowed data density information. FIG. 8A illustrates an example of a flowchart executed during the biometric data registration process. The narrowed data extraction unit 12 calculates a score for narrowing with respect to each pair of the registered narrowed data registered in the registration database 27, and classifies all of the registered narrowed data registered in the registration database 27 with use of a predetermined clustering method based on the score for narrowing (Step S51). Next, the narrowed data extraction unit 12 calculates the number of the registered narrowed data included in each class (Step S52). With the processes, it is possible to perform a prior process with respect to the registered narrowed data.

FIG. 8C illustrates an example of distribution of the number of the registered narrowed data with respect to each class. FIG. 8C is a case where the number of elements (the number of dimensions) of the registered narrowed data is two. The narrowed data extraction unit 12 may register the number of each region or the value obtained by dividing the number of each region by total number in the registration database 27.

FIG. 8B illustrates an example of a flowchart executed during the biometric authentication process. The flowchart of FIG. 8B is executed during the execution of the Step S14 of FIG. 4. The narrowed data density information calculation unit 26 determines the class where the comparison-use narrowed data exists (Step S61). Next, the narrowed data density information calculation unit 26 obtains the density information (the number) of the region determined in the Step S61 (Step S62). With the processes, the narrowed data density information calculation unit 26 can obtain the narrowed data density information. The class of the registered narrowed data may be registered narrowed data registered in the registration database 27 or may be a class of data for studying that is different from the registered narrowed data.

With reference to FIG. 4 again, after the Step S14, the expanded comparing determination unit 25 determines whether the expanded comparing is necessary (Step S15). For example, the expanded comparing determination unit 25 determines density of the distribution of the registered narrowed data by determining whether the narrowed data density information (density) calculated in the Step S14 is larger than a threshold set in advance. When it is determined that the registered narrowed data near the comparison-use narrowed data is dense, the expanded comparing determination unit 25 determines that the expanded comparing is necessary. When it is determined that the registered narrowed data near the comparison-use narrowed data is sparse, the expanded comparing determination unit 25 determines that the expanded comparing is not necessary.

For example, in the example of FIG. 6A and FIG. 6B, the expanded comparing determination unit 25 determines that the expanded comparing is necessary when the difference of the scores for narrowing is less than a threshold, and determines that the expanded comparing is not necessary when the difference of the scores for narrowing is equal to or more than the threshold. In the example of FIG. 7A through FIG. 8C, the expanded comparing determination unit 25 determines that the expanded comparing is necessary when the narrowed data density information is equal to or more than a threshold, and determines that the expanded comparing is not necessary when the narrowed data density information is less than the threshold. A value that is experimentally determined with use of the class of the registered narrowed data in advance may be used as the threshold of the narrowed data density information. A value determined based on a statistic amount of processing result of the narrowed data density information calculation unit 26 may be used as the threshold of the narrowed data density information. For example, in the example of FIG. 7A to FIG. 7C, histogram may be obtained in all regions with respect to density information of each region, and the value of the density information of which frequency (the number of region) is more than 20% may be used as the threshold.

When it is determined as "Yes" in the Step S15, the expanded comparing determination unit 25 increases the number of the objective for comparing based on the narrowed data density information (Step S16). For example, the expanded comparing determination unit 25 may increase the number of the objective for comparing in proportion to the density of the registered narrowed data near the comparison-use narrowed data.

Next, the comparing process unit 23 performs the comparing process between the registered feature data and the comparison-use feature data of a user selected by the narrowing process unit 22 (Step S17). In concrete, the comparing process unit 23 calculates a comparison score between the registered feature data and the comparison-use feature data of each selected user. The comparison score is calculated by a minutia matching, a pattern matching or the like. When a similarity is used as the comparison score, the comparison score gets higher in proportion to the similarity between the registered feature data and the comparison-use feature data. When a difference degree (distance) is used as the comparison score, the comparison score gets lower in proportion to the similarity between the registered feature data and the comparison-use feature data. In the embodiment, the similarity is used as the comparison score.

The determination process unit 24 determines whether a maximum of the comparison score is equal to or more than a threshold (Step S18). When it is determined as "Yes" in the Step S18, the determination process unit 24 determines that the user to be authenticated is a user corresponding to the maximum comparison score and outputs a signal indicating success of the authentication (Step S19). When it is determined as "No" in the Step S18, the determination process unit 24 determines that the user to be authenticated is not registered and outputs a signal indicating failure of the authentication (Step S20). The result of the Step S19 and the Step S20 is shown in the display device 104. After the Step S19 or the Step S20, the flowchart is terminated.

In accordance with the embodiment, an objective user is selected according to density in a predetermined region including a comparison-use narrowed data in a class of a registered narrowed data during a comparing between a registered feature data and a comparison-use feature data. Therefore, the objective user for comparing can be adequately selected. An error of narrowing caused by a bias of the distribution of the registered narrowed data can be suppressed, because the objective for comparing is expanded when the density of the registered narrowed data near the comparison-use narrowed data is high. Therefore, the authentication accuracy is improved. The objective for comparing is not expanded when the density of the registered narrowed data near the comparison-use narrowed data is low. Therefore, authentication time is reduced. Accordingly, in accordance with the embodiment, both improvement of the authentication accuracy and the reduction of the authentication time can be achieved. The density information can be dynamically calculated because the density information is calculated based on the comparison between the comparison-use narrowed data extracted during the authentication process and the registered narrowed data. The density information is based on the result of the comparison between the comparison-use narrowed data and the registered narrowed data. Therefore, the time needed for calculation of the density information can be suppressed. When a prior process with respect to the registered narrowed data is obtained as illustrated in FIG. 7C or FIG. 8C, the time needed for the calculation of the density information can be reduced.

Modified Embodiment

Figure 9:
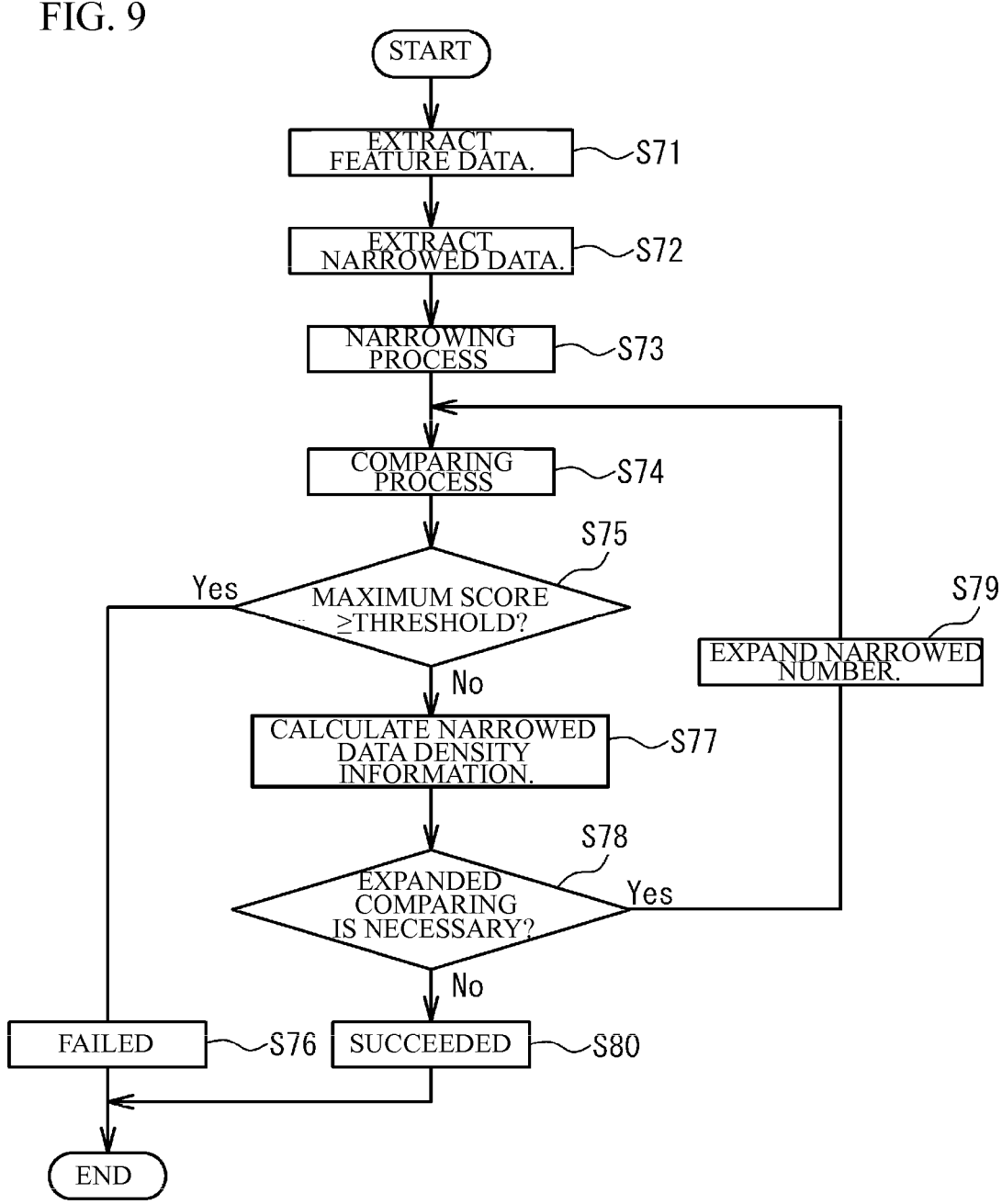
FIG. 9 illustrates an example of a flowchart.

In the above-mentioned embodiment, it is determined whether the expanded comparing is necessary before the comparing process. However, the structure is not limited. For example, it may be determined whether the expanded comparing is necessary when the authentication is failed. FIG. 9 illustrates an example of a flowchart executed in this case. As illustrated in FIG. 9, the feature data extraction unit 11 extracts a comparison-use feature data from biometric information obtained by the biometric sensor 105 (Step S71). Next, the narrowed data extraction unit 12 extracts a comparison-use narrowed data from the comparison-use feature data extracted in the Step S71 (Step S72).

Next, the narrowing process unit 22 narrows objective users for comparing by performing the narrowing process (Step S73). Next, the comparing process unit 23 performs a comparing between a registered feature data and a comparison-use feature data of the user selected by the narrowing process unit 22 (Step S74). Next, the determination process unit 24 determines whether a maximum comparison score is a threshold or more (Step S75). When it is determined as "Yes" in the Step S75, the determination process unit 24 determines that a user to be authenticated corresponds to a user of the maximum comparison score and outputs a signal of success of the authentication (Step S76).

When it is determined as "No" in the Step S75, the narrowed data density information calculation unit 26 uses the class of the registered narrowed data and calculates the density information indicating density of the registered narrowed data near the comparison-use narrowed data (Step S77). Next, the expanded comparing determination unit 25 determines whether the expanded comparing is necessary (Step S78). When it is determined as "Yes" in the Step S78, the expanded comparing determination unit 25 increases the number of the objectives for comparing based on the density information of the narrowed data (Step S79). When it is determined as "No" in the Step S78, the determination process unit determines that the user to be authenticated is not registered and outputs a signal of failure of the authentication (Step S80). After the Step S76 or the Step S80, the flowchart is terminated.

In accordance with the modified embodiment, the comparing process is performed without expanding the objectives for comparing, and it is determined whether the expanded comparing is necessary only when the authentication is failed. In this case, when the authentication is succeeded, the comparing is performed with respect to basic registered data. Therefore, the frequency of expanding the objectives for comparing can be reduced, and increase of the authentication process time can be suppressed.

Second Embodiment

Figure 10:
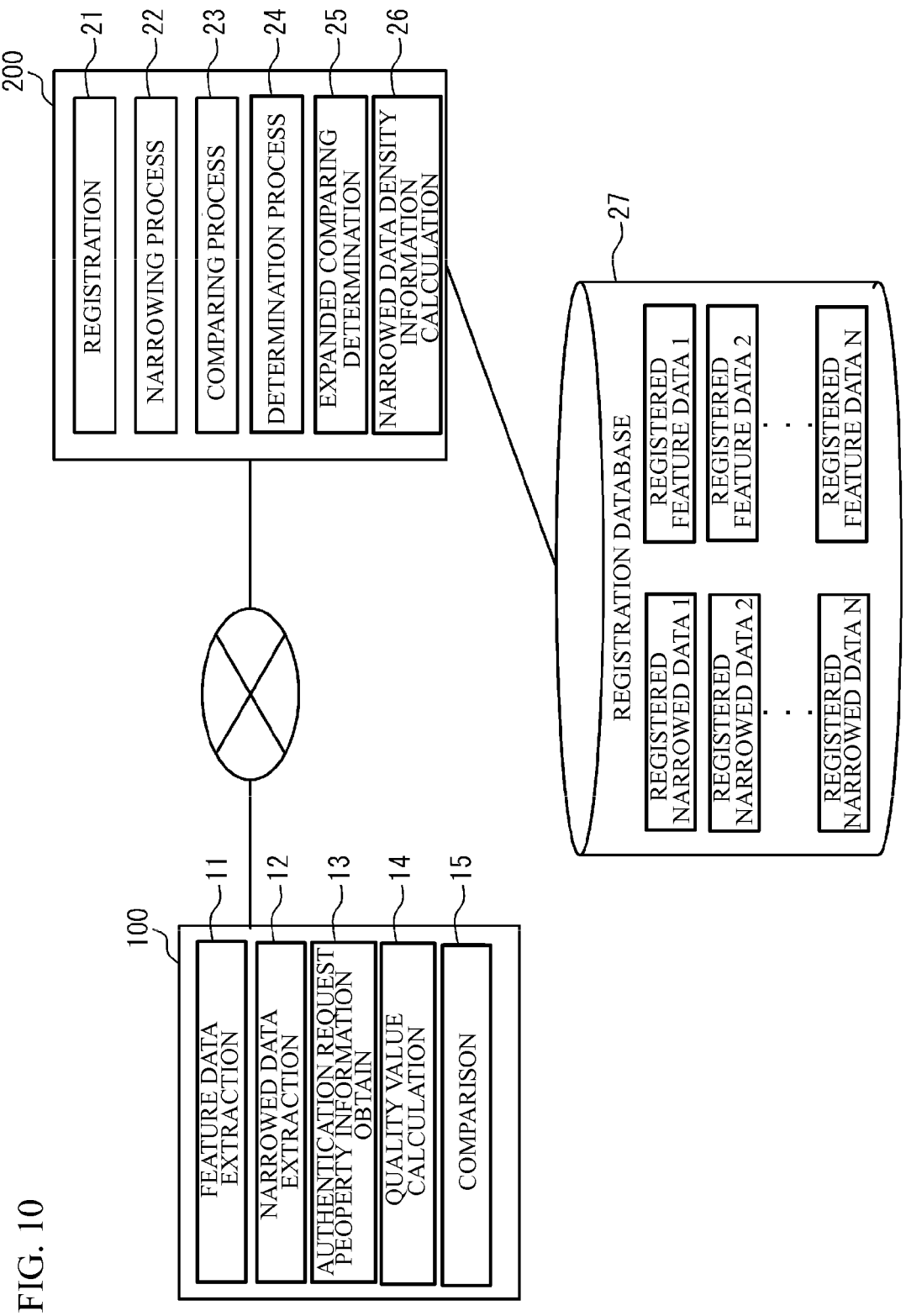
FIG. 10 illustrates a function block diagram of a biometric authentication device in accordance with a second embodiment.

FIG. 10 illustrates a function block diagram of a biometric authentication device 400a in accordance with a second embodiment. By executing the biometric authentication program, the feature data extraction unit 11, the narrowed data extraction unit 12, an authentication request property information obtain unit 13, a quality value calculation unit 14 and a comparison unit 15 are realized in the terminal 100.

The authentication request property information obtain unit 13 obtains property information when the authentication is requested in the terminal 100 to which biometric information is input. The property information is a quality value of the biometric information obtained by the biometric sensor 105 during the biometric authentication process or the like. The quality value calculation unit 14 calculates the quality value by processing the biometric information obtained by the biometric sensor 105. The quality value is used as an index indicating easiness degree of the comparing. For example, Japanese Patent Application Publications No. 2003-337949 and No. 2002-32757 disclose the index.

Information indicating whether a current authentication is a re-authentication may be used as the property information. For example, when an authentication is failed in a previous biometric authentication process, it may be determined that the current authentication is a re-authentication. A previous authentication result may be used as the property information. Alternately, it may be determined that the current authentication is a re-authentication, when a feature data obtained during a biometric authentication process is held for a predetermined time and the feature data is equal to another feature data obtained after the authentication failure (similarity is equal to or more than a predetermined value). The comparison unit 15 may perform the comparison in this case. The comparison process may be the same as the process by the comparing process unit 23.

Figure 11:
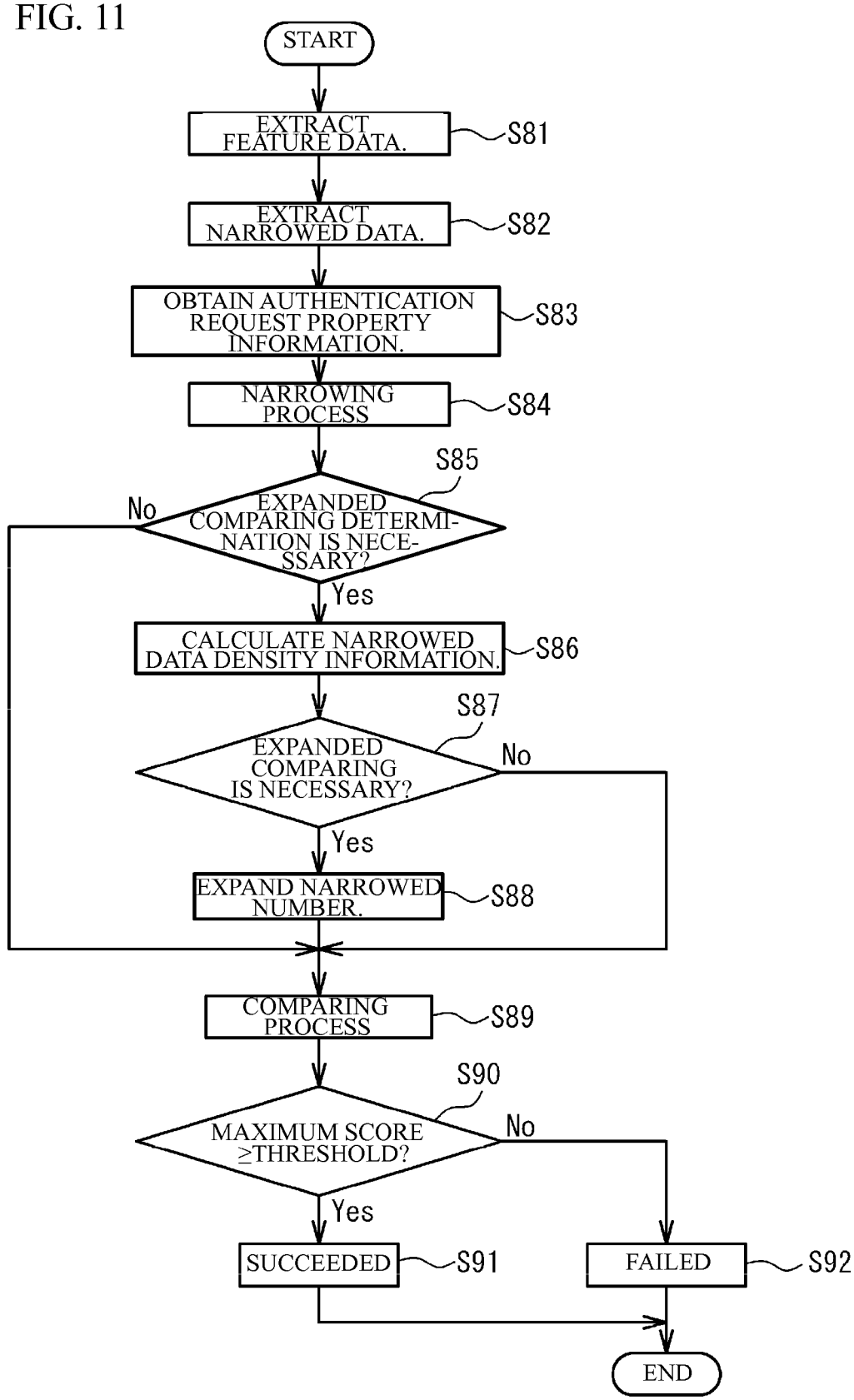
FIG. 11 illustrates a flowchart executed during a biometric authentication process in accordance with a second embodiment.

FIG. 11 illustrates a flowchart executed during a biometric authentication process in accordance with the embodiment. As illustrated in FIG. 11, the feature data extraction unit 11 extracts a comparison-use feature data from biometric information obtained by the biometric sensor 105 (Step S81). Next, the narrowed data extraction unit 12 extracts a comparison-use narrowed data from the comparison-use feature data extracted in the Step S81 (S82).

Next, the authentication request property information obtain unit 13 obtains property information (Step S83). Next, the narrowing process unit 22 narrows users for comparing by performing the narrowing process (Step S84). Next, the expanded comparing determination unit 25 determines whether the determination of the expanded comparing should be performed, based on the property information obtained in the Step S83 (Step S85). For example, the expanded comparing determination unit 25 determines that the biometric information input by the biometric sensor 105 is inadequate for authentication when the quality value is less than a threshold and determines as "No". On the other hand, the expanded comparing determination unit 25 determines as "Yes" when the quality value is equal to or more than the threshold. Alternately, the expanded comparing determination unit 25 determines as "No" in the Step S85 when the current authentication is a re-authentication based on the property information.

When it is determined as "Yes" in the Step S85, the narrowed data density information calculation unit 26 uses the class of the registered narrowed data and calculates the density information indicating density of the registered narrowed data near the comparison-use narrowed data (Step S86). Next, the expanded comparing determination unit 25 determines whether the expanded comparing is necessary (Step S87). When it is determined as "Yes" in the Step S87, the expanded comparing determination unit 25 increases the number of the objectives for comparing based on the density information of the narrowed data density information (Step S88). When it is determined as "No" in the Step S87, when it is determined as "No" in the Step S85, or after the Step S88, the comparing process unit 23 performs the comparing process (Step S89).

Next, the determination process unit 24 determines whether a maximum comparison score is equal to or more than a threshold (Step S90). When it is determined as "Yes" in the Step S90, the determination process unit 24 determines that a user to be authenticated is a used corresponding to the maximum comparison score and outputs a signal of success of authentication (Step S91). When it is determined as "No" in the Step S90, the determination process unit 24 determines that the user to be authenticated is not registered and outputs a signal of failure of authentication (Step S92). After the Step S91 or the Step S92, the flowchart is terminated.

In accordance with the embodiment, even if the objectives for comparing are not expanded, the determination of expanded comparing is omitted when possibility of success of authentication is high. Therefore, the frequency of expanding the objectives for comparing is reduced, and the enlargement of the authentication process time is suppressed.

Third Embodiment

In above-mentioned each example, the authentication is performed with a single authentication server. However, a plurality of authentication servers may be used. In a third embodiment, a base authentication server 200a and one or more than one terminal authentication server 200b are used. The base authentication server 200a and the terminal authentication server 200b may have the same hardware structure as the authentication server 200 of FIG. 1.

Figure 12:
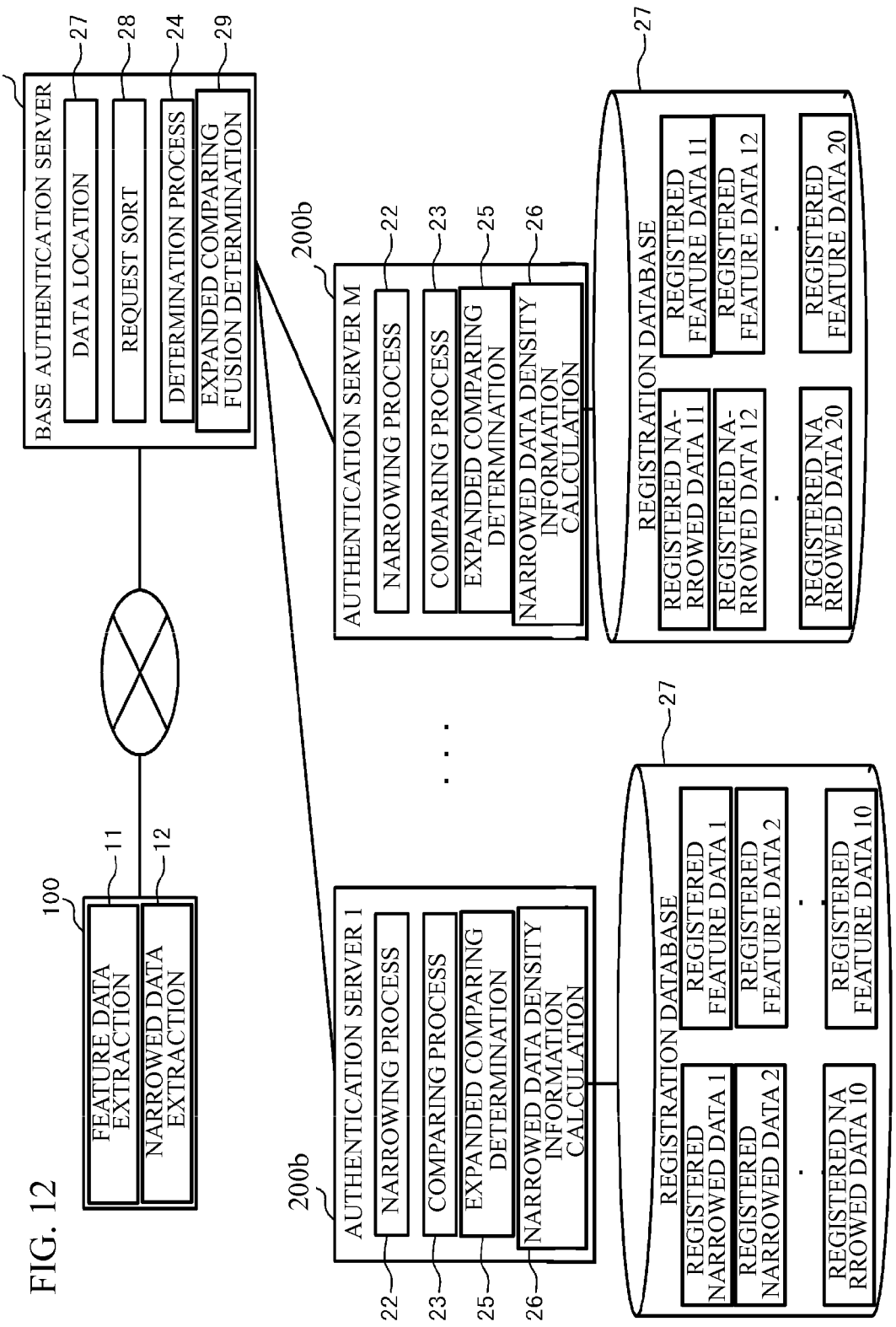
FIG. 12 illustrates a function block diagram of a biometric authentication device in accordance with a third embodiment.

FIG. 12 illustrates a function block diagram of a biometric authentication device 400a in accordance with a third embodiment. By executing the biometric authentication program, the feature data extraction unit 11 and the narrowed data extraction unit 12 are realized in the terminal 100. By executing the biometric authentication program, the determination process unit 24, a data location unit 28, a request-sorting unit 29 and an expanded comparing fusion determination unit 30 are realized in the base authentication server 200a. The narrowing process unit 22, the comparing process unit 23, the expanded comparing determination unit 25, the narrowed data density information calculation unit 26 and the registration database 27 are realized in the terminal authentication server 200b.

The data location unit 28 sorts the registered narrowed data and the registered feature data into the registration databases 27 of the terminal authentication servers 200b with respect to each user during the biometric data registering process. The sorting method is not limited. The registered users may be evenly sorted into the terminal authentication servers 200b. The request-sorting unit 29 sorts the authentication request into the terminal authentication servers 200b. The expanded comparing fusion determination unit 30 determines whether the expanded comparing is performed based on the expanded comparing determination result of each terminal authentication server 200b.

Figure 13:
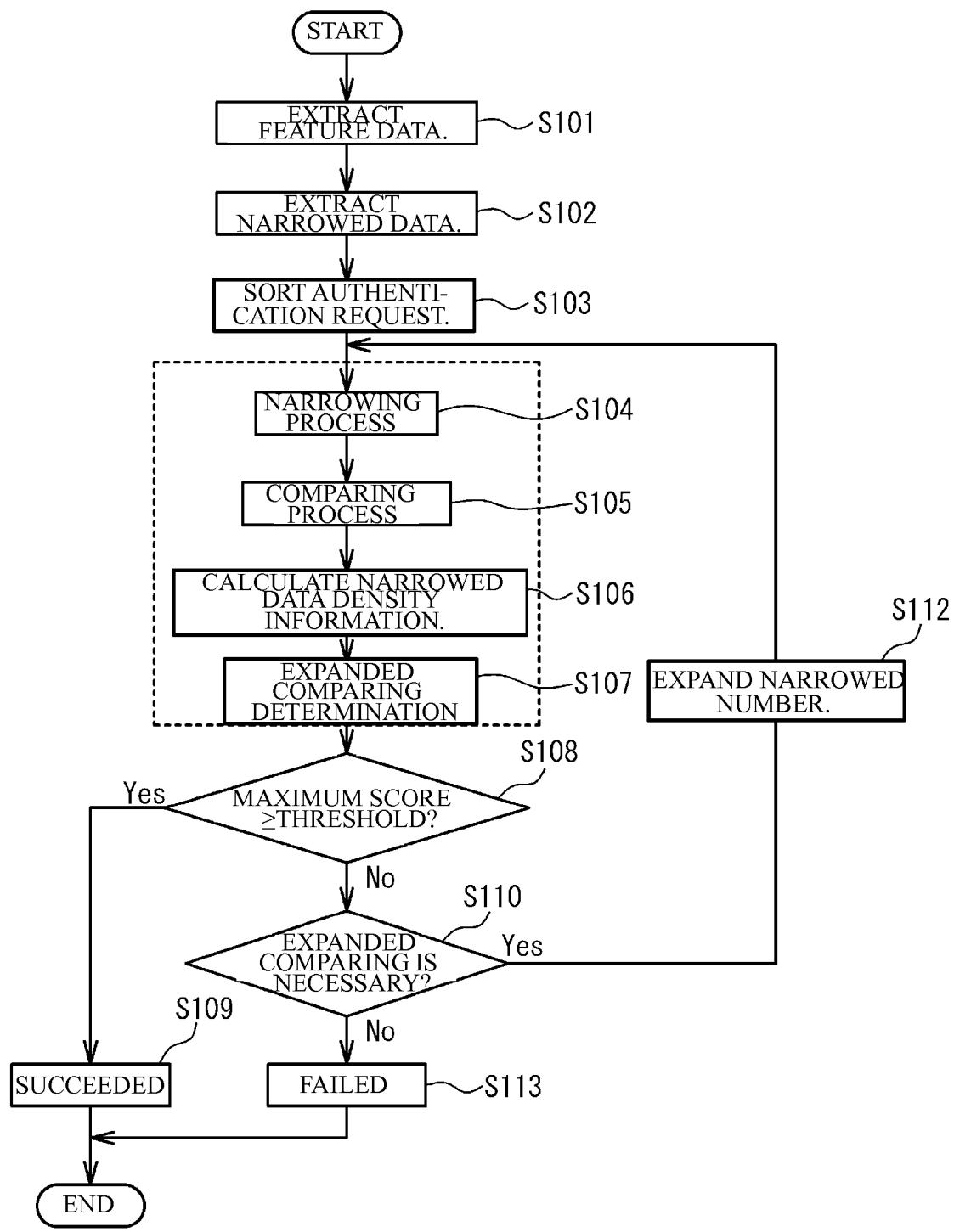
FIG. 13 illustrates an example of a flowchart executed during a biometric authentication process in accordance with a third embodiment

FIG. 13 illustrates an example of a flowchart executed during a biometric authentication process in accordance with the embodiment. As illustrated in FIG. 13, the feature data extraction unit 11 extracts a comparison-use feature data from biometric information obtained by the biometric sensor 105 (Step S101). Next, the narrowed data extraction unit 12 extracts a comparison-use narrowed data from the comparison-use feature data extracted in the Step S101 (Step S102).

The request-sorting unit 29 sorts the authentication request into each terminal authentication server 200b (Step S103). The narrowing process unit 22 of each terminal authentication server 200b narrows users for comparing by performing the narrowing process with respect to users registered in the registration database 27 (Step S104). Next, the comparing process unit 23 of each terminal authentication server 200b performs the comparing process (Step S105). Next, the narrowed data density information calculation unit 26 of each terminal authentication server 200b uses the class of the registered narrowed data registered in the registration database 27 and calculates the density information indicating density of the registered narrowed data near the comparison-use narrowed data (Step S106). Next, the expanded comparing determination unit 25 of each terminal authentication server 200b determines whether the expanded comparing is necessary (Step S107).

Next, the determination process unit 24 determines whether a maximum value of the comparison score calculated by the each terminal authentication server 200b is equal to or more than a threshold (Step S108). When it is determined as "Yes" in the Step S108, the determination process unit 24 determines that the user to be authenticated is a user corresponding to the maximum comparison score and outputs a signal of success of authentication (Step S109).

When it is determined as "No" in the Step S108, the expanded comparing fusion determination unit 30 determines whether the expanded comparing is necessary based on the determination result of the expanded comparing determination unit 25 of each terminal authentication server 200b (Step S110). When it is determined as "Yes" in the Step S110, the expanded comparing fusion determination unit 30 increases the number of the objectives for comparing based on the density information of the narrowed data calculated in each terminal authentication server 200b (Step S112). After the Step S112, the Step S104 is executed again. When it is determined as "No" in the Step S110, the determination process unit 24 determines that the user to be authenticated is not registered and outputs a signal of failure of authentication (Step S113). After the Step S109 or the Step S113, the flowchart is terminated. In accordance with the embodiment, even if the number of the registered users is increased, the authentication process can be performed with high speed.

A storage medium storing a program of a software for realizing the functions of the biometric authentication device 400 may be supplied to the biometric authentication device 400, and the CPU 101 and the CPU 201 may executed the program. The storage medium for supplying the program is a CD-ROM, a DVD, a Blu-ray, an SD card or the like. In the above-mentioned embodiments, each function is realized when the CPU executes the program. However, a dedicated circuit or the like may realize each function.

In the above-mentioned embodiments, the narrowing process unit 22, the expanded comparing determination unit 25 and the narrowed data density information calculation unit 26 act as a selection unit to select users for comparing. The expanded comparing determination unit 25 and the narrowed data density information calculation unit 26 acts as an expanded process unit to expand objective users that are narrowed by the narrowing process unit 22.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device comprising:
   a biometric sensor that obtains biometric information;
   a memory; and
   a circuitry configured to:
   select an objective user according to density of distribution of registered part data within a predetermined range in a set of the registered part data, the predetermined range including a comparison-use part data that is a part of a comparison-use feature data extracted from the biometric information, the registered part data being a part of a registered feature data; and
   perform comparing between a registered feature data of a selected objective user and the comparison-use feature data.

2. The biometric authentication device as claimed in claim 1, wherein the circuitry is configured to:
   narrow objective users by the comparing between the comparison-use part data and the registered part data; and
   expand narrowed objective users when the density is equal to or more than a threshold.

3. The biometric authentication device as claimed in claim 2, wherein the circuitry is configured to expand the narrowed objective users when the comparing between the registered feature data and the comparison-use feature data of the narrowed objective users is failed and the density is equal to or more than a threshold.

4. The biometric authentication device as claimed in claim 2, wherein the circuitry is configured to increase a number of the narrowed users as the density increases.

5. The biometric authentication device as claimed in claim 1, wherein the circuitry is configured not to expand the objective users when a quality value of the biometric information obtained by the biometric sensor is less than a predetermined value.

6. The biometric authentication device as claimed in claim 2, wherein the circuitry is configured to:
   determine whether a user relating to the biometric information obtained by the biometric sensor coincides with a user relating to biometric information that is obtained by the biometric sensor again; and
   not to expand the objective users when it is determined that the user relating to the biometric information obtained by the biometric sensor does not coincide with the user relating to the biometric information that is obtained by the biometric sensor again.

7. The biometric authentication device as claimed in claim 1, wherein the density indicates a relationship between an order of similarities between the comparison-use part data and the registered part data and the similarities.

8. The biometric authentication device as claimed in claim 1, wherein:
   the memory is configured to store a number of the registered part data in each region of a space indicating distribution of part data in advance; and
   the density indicates the number of the registered part data in the region of the space corresponding to the comparison-use part data.

9. The biometric authentication device as claimed in claim 1, wherein:
   the circuitry is configured to classify each registered part data according to each similarity between registered part data;
   the memory is configured to store a number of the registered part data belonging to each class; and
   the density indicates the number of the registered part data in the class corresponding to the comparison-use part data.

10. A biometric authentication method comprising:
    selecting an objective user according to density of distribution of registered part data within a predetermined range in a set of the registered part data, the predetermined range including a comparison-use part data that is a part of a comparison-use feature data extracted from the biometric information obtained by a biometric sensor, the registered part data being a part of a registered feature data; and performing a comparing between a registered feature data of a selected objective user and the comparison-use feature data.

11. The method as claimed in claim 10, wherein:

objective users are narrowed by the comparing between the comparison-use part data and the registered part data; and narrowed objective users are expanded when the density is equal to or more than a threshold.

12. The method as claimed in claim 11, wherein the narrowed objective users are expanded when the comparing between the registered feature data and the comparison-use feature data of the narrowed objective users is failed and the density is equal to or more than a threshold.

13. The method as claimed in claim 11, wherein a number of the narrowed users is increased as the density increases.

14. A computer readable, non-transitory medium storing a program that causes a computer to execute a process, the process comprising:

selecting an objective user according to density of distribution of registered part data within a predetermined range in a set of the registered part data, the predetermined range including a comparison-use part data that is a part of a comparison-use feature data extracted from biometric information obtained by a biometric sensor, the registered part data being is a part of a registered feature data; and performing comparing between a registered feature data of a selected objective user and the comparison-use feature data.

15. The medium as claimed in claim 14, wherein:

objective users are narrowed by the comparing between the comparison-use part data and the registered part data; and narrowed objective users are expanded when the density is equal to or more than a threshold.

16. The medium as claimed in claim 15, wherein the narrowed objective users are expanded when the comparing between the registered feature data and the comparison-use feature data of the narrowed objective users is failed and the density is equal to or more than a threshold.

17. The medium as claimed in claim 15, wherein a number of the narrowed users is increased as the density increases.

* * * * *